(12) United States Patent
Mackay et al.

(10) Patent No.: US 10,089,383 B1
(45) Date of Patent: *Oct. 2, 2018

(54) MACHINE-ASSISTED EXEMPLAR BASED SIMILARITY DISCOVERY

(71) Applicant: Maana, Inc., Palo Alto, CA (US)

(72) Inventors: Jason Forrest Mackay, Sammamish, WA (US); Alina Mihaela Stoica-Beck, Bellevue, WA (US); Ralph Donald Thompson, III, Sammamish, WA (US)

(73) Assignee: Maana, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,866

(22) Filed: Sep. 25, 2017

(51) Int. Cl.
*G06F 17/30* (2006.01)
*G06N 7/00* (2006.01)

(52) U.S. Cl.
CPC ......... *G06F 17/30598* (2013.01); *G06N 7/00* (2013.01)

(58) Field of Classification Search
CPC ......... G06F 17/30389; G06F 17/30554; G06F 17/30646; G06F 17/30309; G06F 17/30292; G06F 17/127
USPC ........................................ 707/722, 736, 758
See application file for complete search history.

(56) References Cited

U.S. PATENT DOCUMENTS

| | | | |
|---|---|---|---|
| 9,576,031 B1 | 2/2017 | Aggarwal et al. | |
| 2008/0250064 A1* | 10/2008 | Duchon | ................ G06Q 30/02 |
| 2012/0284213 A1* | 11/2012 | Lin | ...................... G06N 99/005 706/12 |
| 2015/0379414 A1 | 12/2015 | Yeh et al. | |
| 2016/0246789 A1 | 8/2016 | Wu et al. | |
| 2016/0267166 A1 | 9/2016 | Kohlmeier et al. | |
| 2017/0329817 A1* | 11/2017 | Stoica-Beck | ..... G06F 17/30389 |
| 2017/0359236 A1 | 12/2017 | Circlaeys et al. | |
| 2018/0114227 A1 | 4/2018 | Wang et al. | |

OTHER PUBLICATIONS

Danfeng Din et al., Query Adaptive Similarity for Large Scale Object Retrieval, 2013, IEEE, 1610-1617.*
Office Communication for U.S. Appl. No. 15/934,825 dated May 31, 2018, 56 pages.

* cited by examiner

*Primary Examiner* — Jean B Fleurantin
(74) *Attorney, Agent, or Firm* — John W. Branch; Lowe Graham Jones PLLC

(57) ABSTRACT

Embodiments are directed towards managing data. An attributes engine may be employed to perform various actions, including: analyzing characteristics of model object features of a plurality of model objects; classifying the model object features based on the characteristics, such that the characteristics include a data type and values of the model object features; and associating similarity tasks with the model object features based on their classification. A similarity engine may then be employed to perform further actions, including: providing a similarity model that includes the similarity tasks; employing the similarity model to provide candidate similarity scores based on exemplar model objects labeled as being similar; modifying the similarity model based on the exemplar model objects and the candidate similarity scores; employing the modified similarity model to provide similarity scores for model objects based on the one or more similarity tasks.

28 Claims, 9 Drawing Sheets

US 10,089,383 B1

MACHINE-ASSISTED EXEMPLAR BASED SIMILARITY DISCOVERY

TECHNICAL FIELD

This invention relates generally to information organization and data modeling and more particularly, to characterizing data objects for searching and analysis.

BACKGROUND

Organizations are generating and collecting an ever increasing amount of data. Data may be directly or indirectly generated from disparate parts of the organization, such as, consumer activity, manufacturing activity, customer service, quality assurance, or the like. For various reasons, it may be inconvenient for such organizations to effectively utilize their vast collections of data. In some cases the quantity of data may make it difficult to effectively utilize the collected data to improve business practices. In other cases, the data collected by different parts of an organization may be stored in different formats, stored in different locations, organized arbitrarily, or the like. Further, employees within the organization may not be aware of the purpose or content of the various data collections stored throughout the organization. Accordingly, it may be difficult to discover relevant relationships such as similarity among portions of the data collections. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
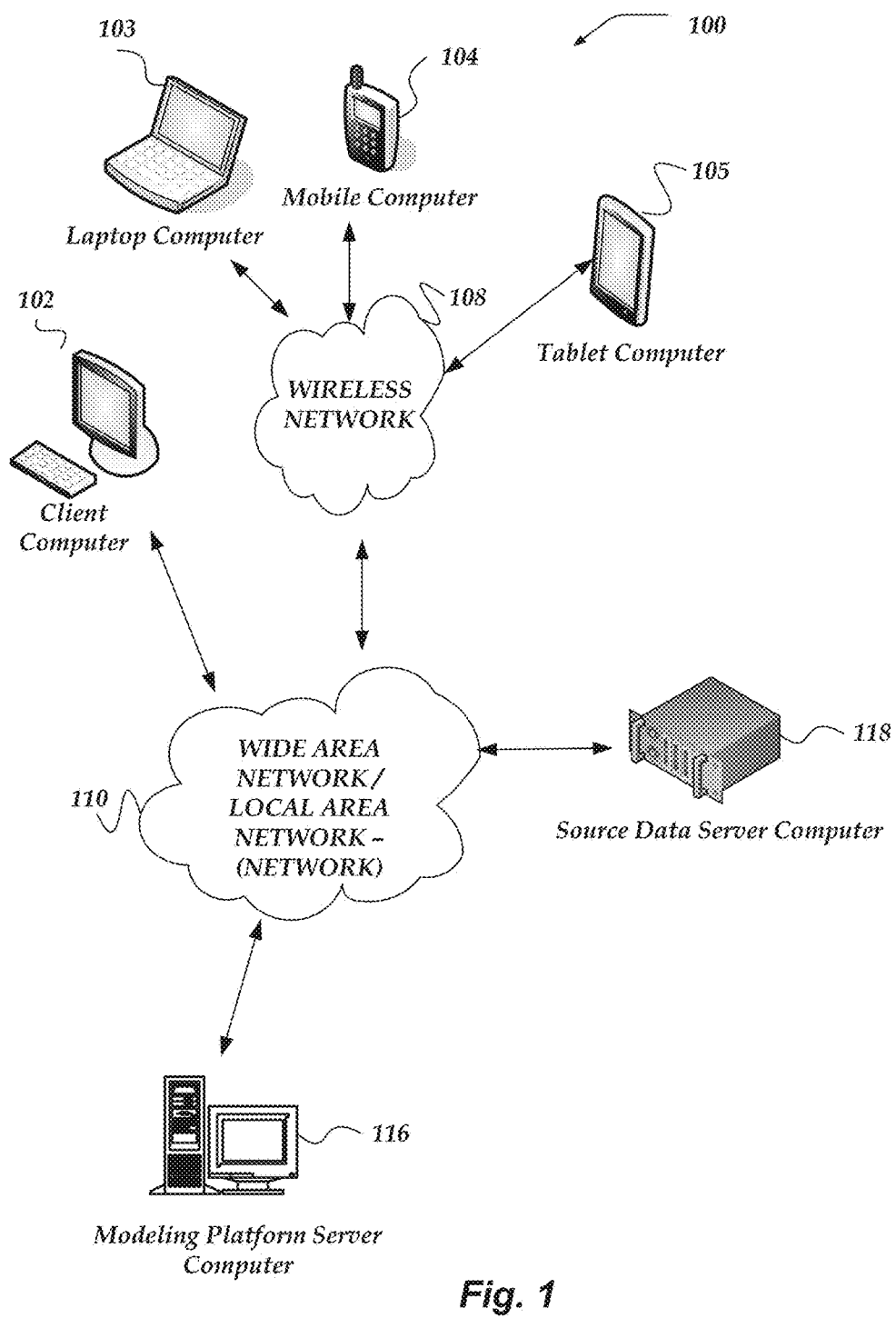
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "raw data set," or "data set" refer to data sets provided by an organization that may represent the items to be included in a system model. In some embodiments raw data may be provided in various formats. In simple cases, raw data may be provided in spreadsheets, databases, csv files, or the like. In other cases, raw data may be provided using structured XML files, tabular formats, JSON files, models information from one or more other system models, or the like. In one or more of the various embodiments, raw data in this context may be the product one or more preprocessing operations. For example, one or more pre-processing operations may be executed on information, such as, log files, data dumps, event logs, database dumps, unstructured data, structured data, or the like, or combination thereof. In some cases, the pre-processing may include data cleansing, filtering, or the like. The pre-processing operations, if any, may occur before the information may be considered to be raw data. The particular pre-processing operations may be specialized based on the source, context, format, veracity of the information, access opportunities, or the like. In most cases, raw data may be arranged such that it may be logically viewed as comprising one or more objects, tables, having one or more identifiable fields and/or columns, or the like.

As used herein, the terms "raw data objects," or "data objects" refer to objects or tables that comprise raw datasets. For example, if a dataset is comprised of a plurality of tabular record sets, the separate tabular record sets may be consider data objects. A data object may be arranged to include one or more records having one or more fields.

As used herein, the term "model object" refers to an object that models various characteristics of a data object. Model objects may include one or more model object fields that include one or more attributes (e.g., model field attributes) that represent features or characteristics of their corresponding data object fields. Accordingly, while a data object may have thousands or millions of records, its corresponding model object may be arranged to include model object fields that include attributes describing one or more characteristics of their underlying data object fields rather than thousands or millions of records.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing data using one or more processors, included in one or more network computers. In one or more of the various embodiments, an attributes engine may be employed to various actions, including: analyzing one or more characteristics of one or more model object features of a plurality of model objects; classifying the one or more model object features based on the one or more characteristics, such that the one or more characteristics include a data type and one or more values of the one or more model object features; and associating one or more similarity tasks with the one or more model object features based on their classification.

Then, in one or more of the various embodiments, a similarity engine may be employed to perform further actions, including: providing a similarity model that includes the one or more similarity tasks; employing the similarity model to provide one or more candidate similarity scores based on one or more exemplar model objects that may be labeled as being similar, such that the one or more exemplar model objects may be provided by a similarity client application; modifying the similarity model based on the one or more exemplar model objects and the one or more candidate similarity scores; employing the modified similarity model to provide similarity scores for one or more model objects, such that providing the similarity scores may be based on execution of the one or more similarity tasks that may be associated with the one or more model object features of the one or more model objects; and identifying two or more similar model objects based on the similarity scores.

In one or more of the various embodiments, the attributes engine may be arranged to performs further actions, including: classifying one or more of the model object fields that include another model object by classifying the other model object's features; associating one or more additional similarity tasks with the other model object's features; and including the one or more additional similarity tasks in the similarity model.

In one or more of the various embodiments, modifying the similarity model based on the one or more exemplar model objects, further include: employing the similarity model to provide the one or more candidate similarity scores associated with the one or more exemplar model objects; and modifying one or more portions of the similarity model if the candidate similarity score may be below a defined threshold value; and providing additional candidate similarity scores until one or more of the additional candidate similarity scores exceeds the defined threshold.

In one or more of the various embodiments, the similarity client application may be arranged to perform further actions, including: displaying the similarity model in a user interface on a hardware display to a user to provide feedback based on the for the similarity model; and modifying the similarity model based on the provided feedback.

In one or more of the various embodiments, classifying the one or more model object features may include classification of the one or more model object features as one or more of singled valued, set valued, vector valued, or sequence valued.

In one or more of the various embodiments, providing similarity scores for the one or more model objects, may further include, providing a combination of one or more model object feature similarity scores such that the one or more model object feature similarity score may be provided by the one or more similarity tasks.

In one or more of the various embodiments, the similarity engine may be arranged to perform further actions, including: associating the modified similarity model with one or more of a user, an organization, or a client; and differently modifying different instances of the similarity model associated with different users, different organizations, or different clients.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, modeling platform server computer 116, one or more source data server computers 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, modeling platform server computer 116, one or more source data server computers 118, or other computers.

Client computers 102-105 may further be configured to include a client application that enables an end-user to log into an end-user account that may be managed by another computer, such as modeling platform server computer 116, one or more source data server computers 118, or the like. Such an end-user account, in one non-limiting example, may be configured to enable the end-user to manage one or more online activities, including in one non-limiting example, project management, software development, system administration, data modeling, search activities, social networking activities, browse various websites, communicate with other users, or the like. Also, client computers may be arranged to enable users to display reports, interactive user-interfaces, and/or results provided by modeling platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, modeling platform server computer 116, one or more source data server computers 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of modeling platform server computer 116 is described in more detail below in conjunction with FIG. 3. Briefly, however, modeling platform server computer 116 includes virtually any network computer that is specialized to provide data modeling services as described herein.

Although FIG. 1 illustrates modeling platform server computer 116 as a single computer, the innovations and/or embodiments are not so limited. For example, one or more functions of modeling platform server computer 116, or the like, may be distributed across one or more distinct network computers. Moreover, modeling platform server computer 116 is not limited to a particular configuration such as the one shown in FIG. 1. Thus, in one embodiment, modeling platform server computer 116 may be implemented using a plurality of network computers. In other embodiments, server computers may be implemented using a plurality of network computers in a cluster architecture, a peer-to-peer architecture, or the like. Further, in at least one of the various embodiments, modeling platform server computer 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
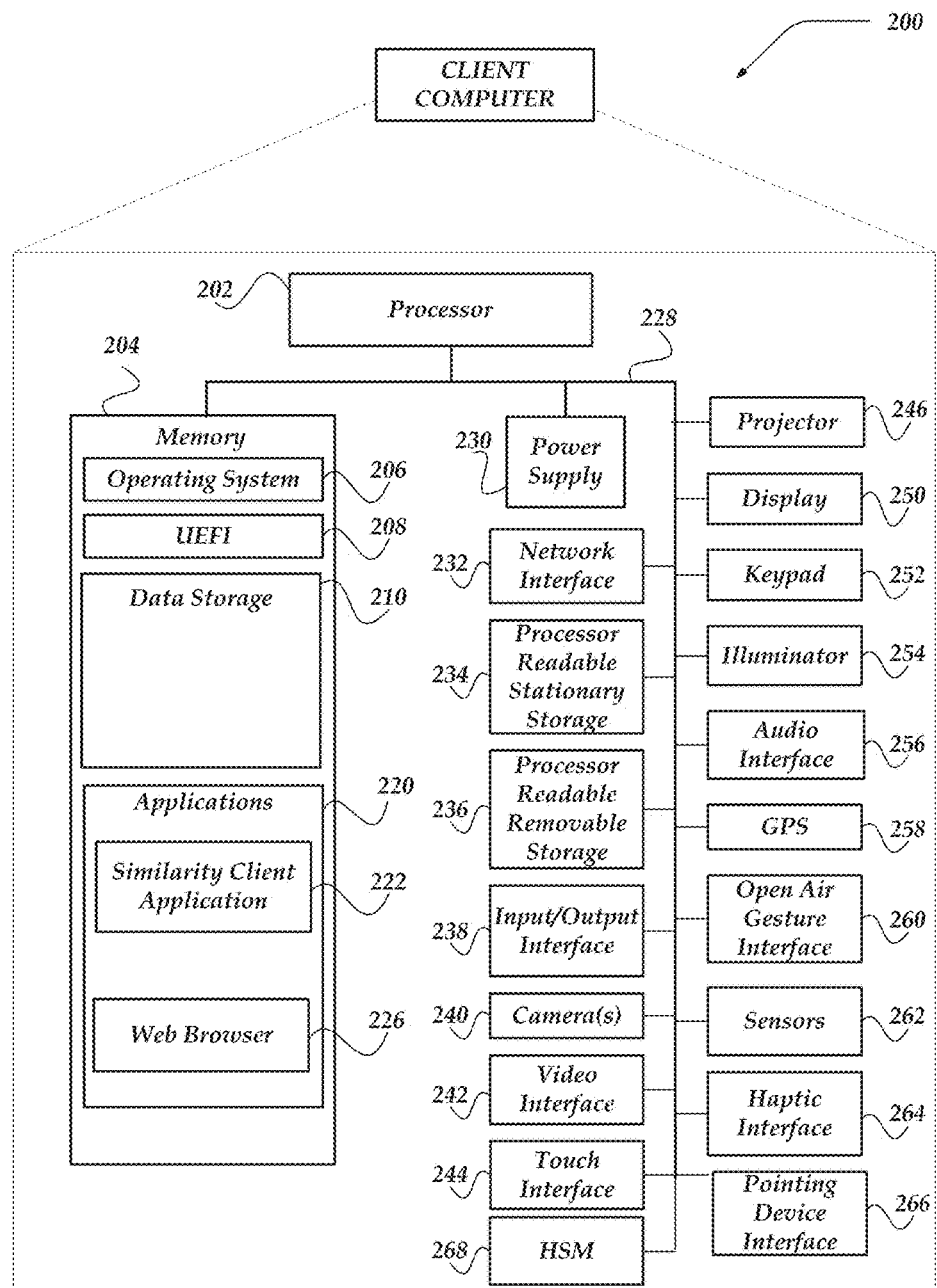
FIG. 2 shows a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope, accelerometer, or the like may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, electronic paper, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, Bluetooth Low Energy. or the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, similarity client application 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™, Bluetooth Low Energy, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, user credentials, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, similarity client application 222. In at least one of the various embodiments, similarity client application 222 may be used to interact with a modeling platform.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
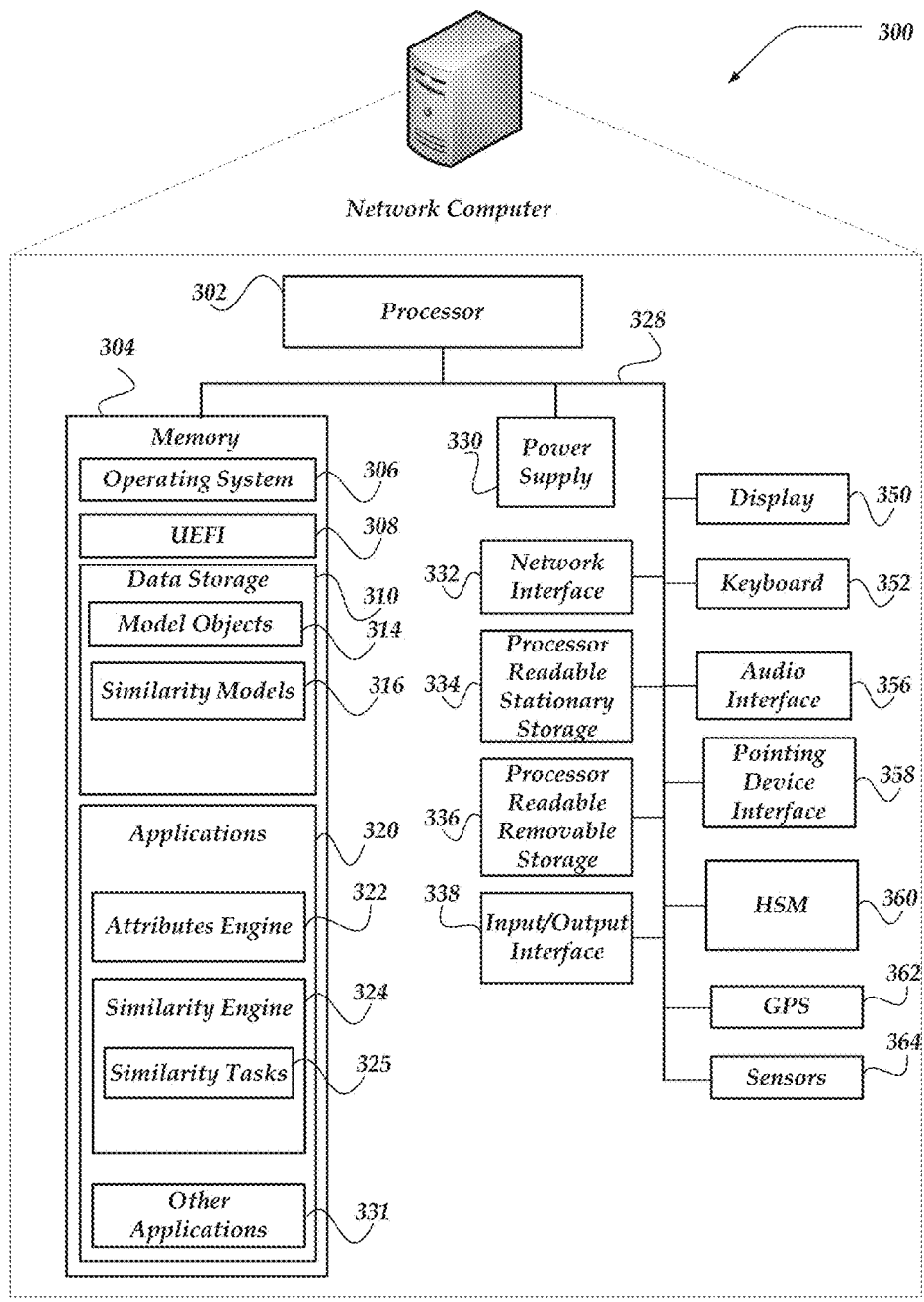
FIG. 3 illustrates a schematic embodiment of a network computer.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, model objects 314, similarity models 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include attributes engine 322, similarity engine 324, similarity tasks 325, other applications 331, or the like, that may perform actions further described below. In at least one of the various embodiments, one or more of the applications may be implemented as modules and/or components of another application. Further, in at least one of the various embodiments, applications may be implemented as operating system extensions, dynamic libraries, modules, plugins, Application Specific Integrated Circuits (ASICs), Field Programmable Gate Arrays (FPGAs), Programmable Array Logic (PALs), or the like, or combination thereof.

In at least one of the various embodiments, applications, such as, attributes engine 322, similarity engine 324, similarity tasks 325, other applications 331, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 110.

Furthermore, in at least one of the various embodiments, attributes engine 322, similarity engine 324, similarity tasks 325, other applications 331, may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to attributes engine 322, similarity engine 324, similarity tasks 325, other applications 331, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
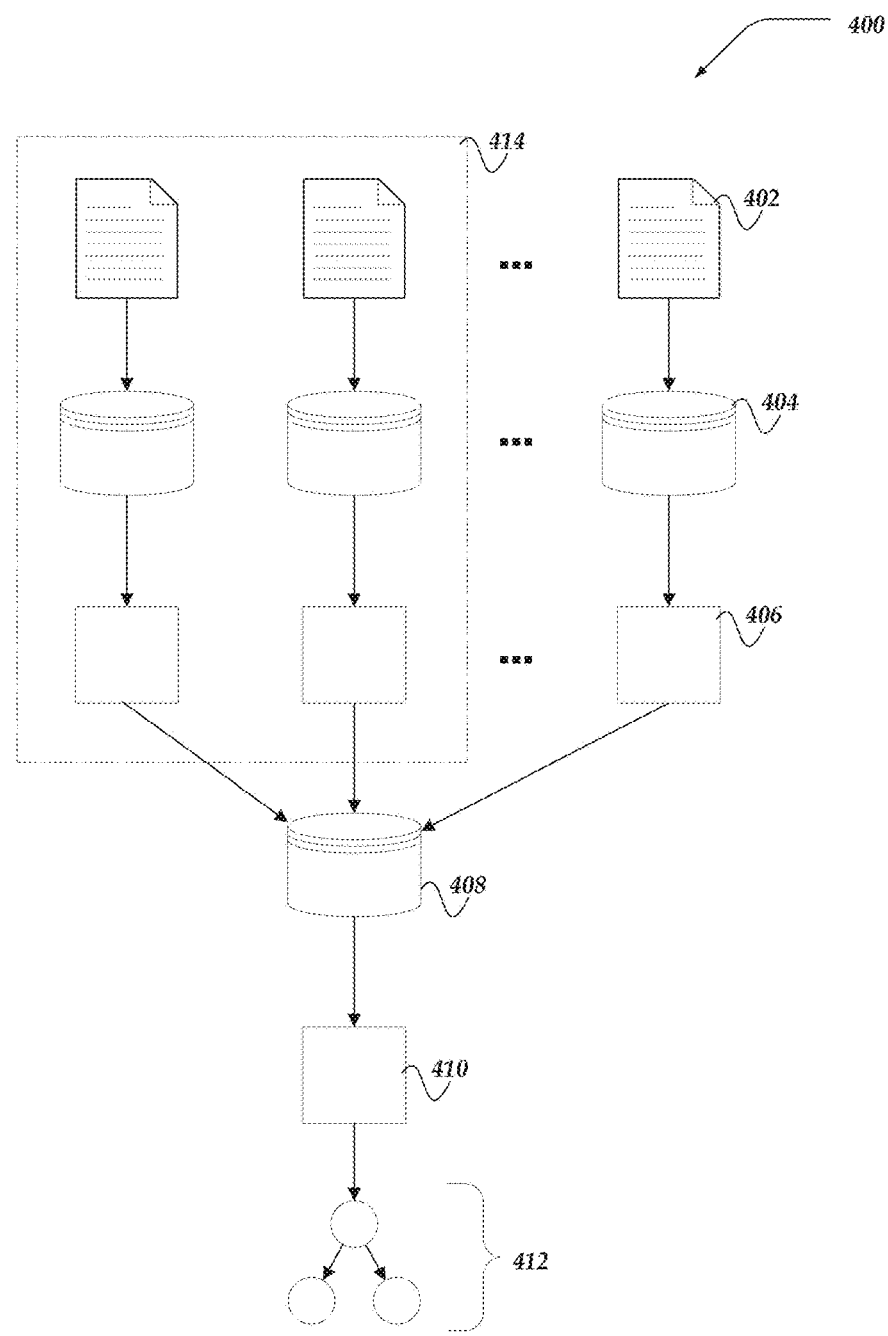
FIG. 4 shows a logical schematic of a portion of a modeling platform that is arranged to perform machine-assisted exemplar based similarity discovery in accordance with one or more embodiments.

FIG. 4 shows a logical schematic of a portion of modeling platform 400 that is arranged to perform machine-assisted exemplar based similarity discovery in accordance with one or more embodiments. In one or more of the various embodiments, a modeling platform may be arranged to analyze datasets to produce one or more similarity models for various objects based on the similarity of their features. In some embodiments, similarity models may be associated with one or more system models, data models, or the like. Accordingly, similarity models may be employed to provide predictions, estimates, scores, or the like, regarding the similarity between or among one or more model objects that may comprise system models, data models, or the like.

In one or more of the various embodiments, modeling platform 400 may be provided various raw datasets from various sources. In some embodiments, these datasets may be very large collections with several or millions of records per data object. Accordingly, a modeling platform such as modeling platform 400, may be used to model the datasets.

In one or more of the various embodiments, the modeling platform may be arranged to receive datasets and produce similarity models that enable users or applications to compare different objects of a given type to measure their similarity. In particular modeling platform 400 may be arranged to identify fields representing features of the different model objects for generating feature-based similarity models. In some embodiments, a similarity engine may be arranged to associate different or particular similarity tasks with the various fields or features depending the characteristics of the features.

In one or more of the various embodiments, dataset 402 may be provided to data store 404. As described in above, data set 402 may be different be provided in various forms, formats, and so on. Also, in one or more of the various embodiments, data set 402 may be the result of some initial data cleansing or data formatting before being stored on data store 404.

In one or more of the various embodiments, an attributes engine, such as, attributes engine 406 may be arranged to analyze the data object stored in data store 404. Briefly, attributes engine 406 may process the data objects included in data set 402 to produce one or more model objects that correspond to the data objects.

In one or more of the various embodiments, as model objects are generated they may be stored in another data store, such as, data store 408. In one or more of the various embodiments, data store 408 represents a data store for storing one or more model objects. In some embodiments, data store 408 may be logically or physically separate from data store 404. Further, in some embodiments, data stores, such as data store 404 and data store 408 may be physical or logically segmented into portions the are allocated to one or more users. Accordingly, in some embodiments, one or more users may be prevented from accessing data and objects unless they have explicit access permissions.

In one or more of the various embodiments, a similarity engine, such as similarity engine 410 may be arranged to analyze one or more model objects to produce similarity models based on a number of example object provided by users. In one or more of the various embodiments, the analysis may include identifying one or more features, features types, features weights, or the like.

In one or more of the various embodiments, users may modify the weight values of different features discovered in the model objects to reflect their own understanding of what it means for objects to be similar.

In one or more of the various embodiments, attributes engine 406 may be arranged to perform analysis comprised of monoidal operations that enable two or more attribute engine instances to run in parallel. In some embodiments, portions of data sets may be distributed across one or more data stores. Accordingly, in some embodiments, two or more attribute engines may process portions of the data sets to produce partial attribute values. Thus, in one or more of the various embodiments, the partial attribute values may be reduced or combined to produce attribute values for the model objects stored in data store 408.

In one or more of the various embodiments, partial cluster 414 represents parallel or concurrent operations performed by two or more attribute engines. Note, in some embodiments, the separate attribute engines may be arranged to process data objects stored on the same or shared data store.

In one or more of the various embodiments, similarity engine 410 may be arranged to classify features of the one or more model objects based on the type of values, number of values, range of values, composition of values, or the like. Accordingly, in one or more of the various embodiments, similarity engine 410 may generate similarity models, such as similarity model 412 for providing a similarity score if two or more model objects of the type are compared.

For example, given an object $obj_1$ of type t, a similarity model may be arranged for discovering the objects of type t that may be the most similar to it. Accordingly, in one or more of the various embodiments, the similarity between the object $obj_1$ and each other object $obj_2$ of type t may be computed. In some embodiments, similarity may be represented as the function $sim(obj_1, obj_2)$. If T is the set of objects of type t, sim may be considered a function defined on T×T In general, for a function sim to be a valid similarity task, it has to:

have values between 0 and 1 (the greater the value, the greater the similarity between objects):

sim: T×T→[0, 1] and be symmetrical: $sim(obj_1, obj_2)=sim(obj_2, obj_1)$.

In some embodiments, a similarity engine, such as, similarity engine 410 may be arranged perform the following actions: for each feature f characterizing the type t, a feature-based similarity between two objects using the feature f alone may be determined. Let this similarity be: $sim_f(obj_1, obj_2)$. Accordingly, the global similarity between the two objects may then be defined as a function of the feature level similarities. For example, in some embodiments, the global similarity can be defined as a linear combination of the feature level similarities:

$$\alpha_1 \cdot \text{sim}(\text{obj}_1, \text{obj}_2) + \alpha_2 \cdot \text{sim}(\text{obj}_1, \text{obj}_2) + \ldots + \alpha_k \cdot \text{sim}(\text{obj}_1, \text{obj}_2)$$

where k is the number of features characterizing the type t and $\alpha_i \in [0, 1]$ such that $\Sigma_{i=1, \ldots, k} \alpha_i = 1$.

In one or more of the various embodiments, the different features may be used to compute object similarity models based on each feature of model objects. The feature level similarity may be combined with the feature similarity values in a weighted similarity measure for two or more model objects.

The combination of values in a weighted sum is a classical approach in machine learning. It may be used in well-known algorithms like linear/logistic regression, support vector machines, deep learning networks, or the like. However, as opposed to most machine learning approaches, the similarity engine is optimally configured and arranged to require less preprocessing or data normalization of the raw data or model objects. For example, raw data or model objects do not have to be flattened nor do their feature values have to be numerical or of the same data type. Instead, in one or more of the various embodiments, the optimized similarity engine may be arranged to compare model objects that include un-flattened features (e.g., relational features) as well as features having different types. Because the similarity engine may be optimized to handle different feature types directly, as they are, without any requiring additional pre-processing. As described, herein, at least this performance optimization is realized by arranging the attribute engine to automatically select and map particular similarity tasks to model object features that the optimized similarity engine uses for providing similarity scores for comparing model objects. This optimization improves the performance of the modeling platform server computer by avoiding the traditional pre-processing (e.g., flattening, data normalization, or the like).

Also, in one or more of the various embodiments, the values of the features can be model objects themselves (and thus have their own features). Accordingly, the similarity engine may be arranged to compare model objects that are not flat (as rows in a relational table), but have a hierarchical structure where features may be composed of features.

Accordingly, in one or more of the various embodiments, the similarity engine may be arranged to estimate the feature weights based on very little input from users (possibly a single pair of very similar objects). Also, in some embodiments, the similarity engine may be arranged to provide a different set of feature weights for each different user, thus trying to capture each user's idea of a model object's similarity. Accordingly, the similarity engine may enable similarity models that reflect different users individual understanding of object similarity.

Generalized Operations

FIGS. 5-9 represent the generalized operations for machine-assisted similarity discovery in accordance with at least one of the various embodiments. In one or more of the various embodiments, processes 500, 600, 700, 800, and 900 described in conjunction with FIGS. 5-9 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, one or more of the various embodiments, the processes described in conjunction with FIGS. 5-9 may be operative in machine-assisted similarity discovery such as described in conjunction with FIG. 4.

Figure 5:
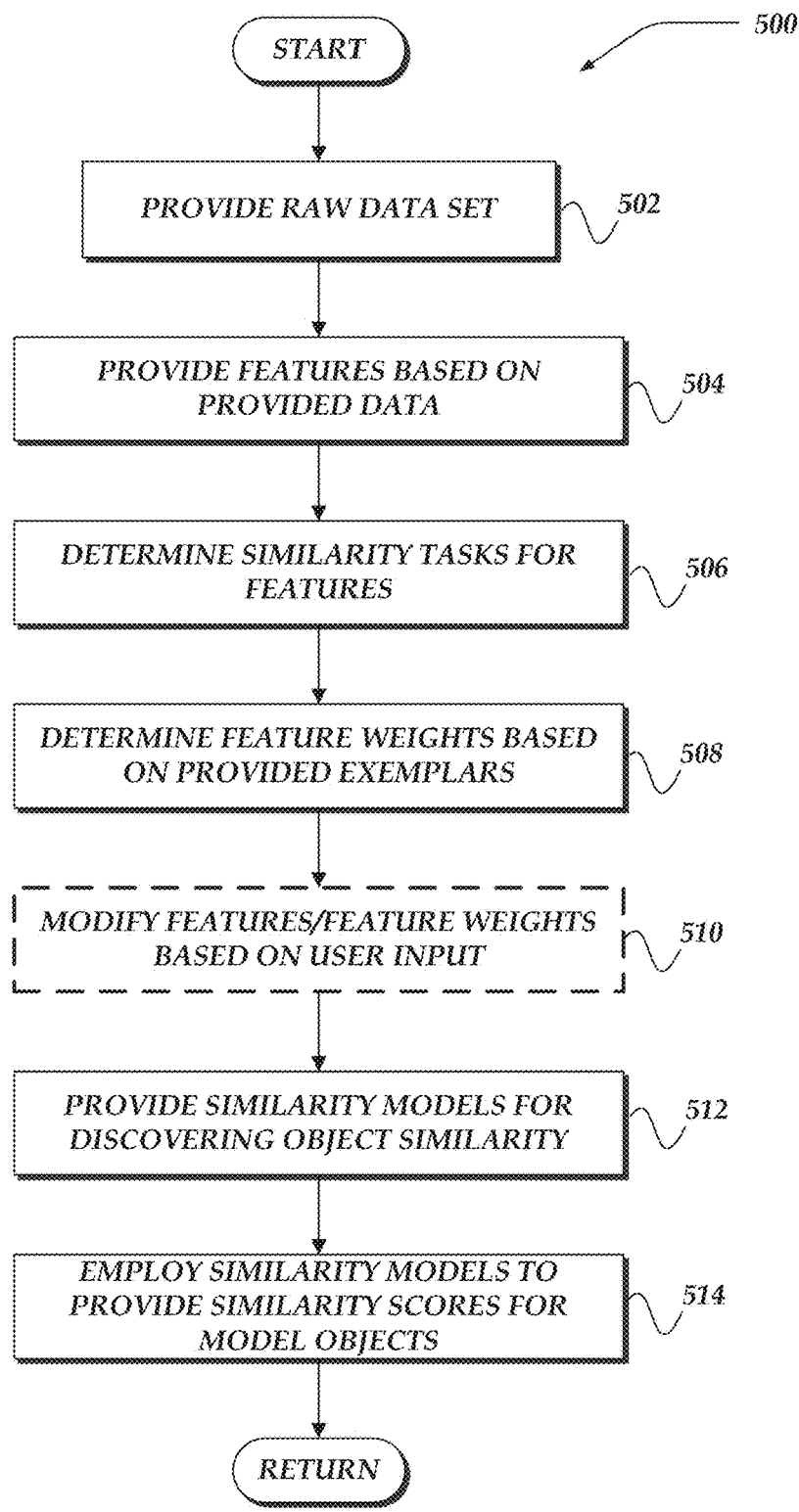
FIG. 5 illustrates an overview flowchart for a process for machine-assisted similarity discovery in accordance with one or more of the various embodiments.

FIG. 5 illustrates an overview flowchart for process 500 for machine-assisted similarity discovery in accordance with one or more of the various embodiments. After a start block, at block 502, in one or more of the various embodiments, raw data may be provided to a modeling platform. As described above, in one or more of the various embodiments, the modeling platform may be arranged to ingest raw data in the form of raw datasets to produce similarity models that enable a user or application to gain insights into the underlying data and its relationships.

At block 504, in one or more of the various embodiments, one or more features may be provided based on the provided data sets. In one or more of the various embodiments, the modeling platform may be arranged to provide model objects from the raw data and to identify features that may be associated with the different model objects discovered in the provided data. Accordingly, in one or more of the various embodiments, the raw data set may include one or more data objects from which the modeling platform may be arranged to transform into one or more model objects.

At block 506, in one or more of the various embodiments, a similarity engine may be arranged to determine or select similarity tasks for evaluating each feature of the model objects. In one or more of the various embodiments, the similarity engine may be arranged to analyze the features to generate similarity tasks appropriate for determining a similarity models for different model objects. As discuss in more detail below, the particular similarity task for a model object type may be based on the types or values of the features that comprise the model objects.

At block 508, in one or more of the various embodiments, the similarity engine may be arranged to determine feature weights based on one or more exemplars. Accordingly, in one or more of the various embodiments, a user may identify two or more model objects that may be considered similar by the user. In one or more of the various embodiments, the two or more user-identified similar objects may be used by the similarity engine to compute weight values that may be used in similarity models to evaluate the similarity of other model objects of the same type.

In one or more of the various embodiments, the similarity engine may be arranged to automatically modify one or more feature weight values and compare similarity scores produced by the similarity model. In one or more of the various embodiments, if the similarity scores for the exemplar model objects produced by the similarity model meet or exceed a defined threshold, the similarity model may be considered ready for deployment.

In one or more of the various embodiments, the similarity engine may be arranged to automatically modify one or more portions (e.g., coefficients, constants, sub expressions, or the like) and compare similarity scores produced by the similarity model. In one or more of the various embodiments, if the similarity scores for the exemplar model objects produced by the similarity model meet or exceed a defined threshold, the similarity model may be considered ready for deployment.

In one or more of the various embodiments, the similarity engine may be arranged to iteratively compute similarity scores between the exemplar model objects (e.g., two or more model objects that are considered similar) until the similarity score produced by the similarity model converges to a value that indicates that the exemplar model objects are similar.

In one or more of the various embodiments, the particular iterative actions, such as, modifying (e.g., incrementing or decrementing) feature weight values, modifying similarity task coefficients, or the like, may be determined based on various factors, such as, the particular type of similarity task, configuration information, configuration rules, or the like.

For example, in one or more of the various embodiments, a similarity score threshold may be defined as 0.90. Accordingly, in this example, the similarity engine may be arranged to iteratively modify the similarity model until it produces similarity scores for the exemplar model objects that meet or exceed 0.90. The particular similarity score threshold value may be selected by user input, configuration values, default values, or the like.

At block 510, in one or more of the various embodiments, optionally, the modeling platform may be arranged to enable authorized users to modify the features weights accordingly their own preferences. In one or more of the various embodiments, the modeling platform may be arranged to provide a user-interface that enable authorized users to adjust the features weight to better accommodate their own understanding of similarity for a given model object type. Similarly, in some embodiments, the similarity engine may be arranged to automatically adjust one or more feature weights based on configuration information or one or more rule-based policies.

Accordingly, in some embodiments, a user of a modeling platform may be enabled to adjust the feature weights to represent their preferences with respect to which features are more important for determining object similarity. Note, in some embodiments, different users (or organizations) may use different feature weights for the same types of model objects. These differences may represent that different person or organizations may have different concepts of similarity even if they are comparing the same type of model objects.

For example, in one or more of the various embodiments, two similarity models for model objects representing movies may have different feature weights. In this example, these differences in weight values may be because one user may consider the most important similarity to be the year the movie was released while another user may consider the director of a movie as its most important similarity feature. Thus, in this example their similarity models may have different weights that reflect the purpose or requirements of their particular similarity models.

Likewise, in some embodiments, a user may modify similarity models by including or excluding one or more features. In one or more of the various embodiments, features determined by a user to be unnecessary for a particular similarity model may be excluded.

In some embodiments, this block may be considered optional because the user may not be required to modify the feature weights. Also, in some embodiment, the user may be prevented, restricted, or otherwise disabled from modifying feature weights. For example, in some embodiments, the similarity engine may be arranged to automatically prevent, restrict, or otherwise disable one or more users from modifying feature weights based on configuration information or one or more rule-based policies.

At block 512, in one or more of the various embodiments, the modeling platform may be arranged to provide one or more similarity models for discovering model object similarity. In one or more of the various embodiments, the provided similarity models may be stored in a data store for use by a similarity engine, such as similarity engine 324. In one or more of the various embodiments, a particular similarity model may be associated with a user, organization, client, customer, or the like. Accordingly, in some embodiments, the concept of similarity for a given set of model object or data sets may be tailored to the user, organization, client, customer, or the like, that is associated with the similarity model.

At block 514, in one or more of the various embodiments, similarity models may be provided or otherwise made available for measuring or scoring the similarity of two or more model objects. In one or more of the various embodiments, if a user provides two or more model objects of the same type to a similarity engine that includes a similarity model for that type of model object, the similarity engine may be arranged to employ the similarity model to score the provided model objects for similarity. Next, control may be returned to a calling process.

Figure 6:
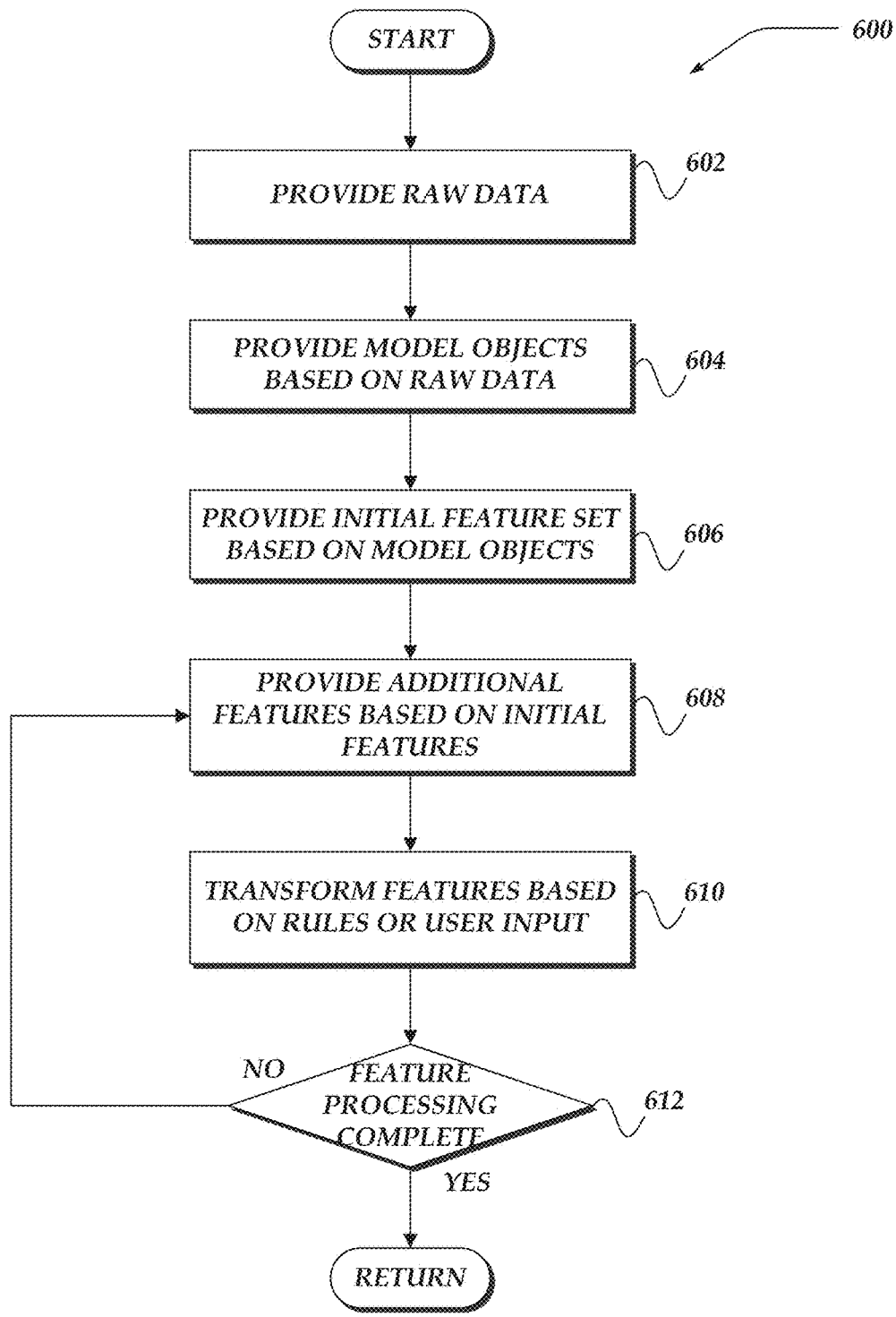
FIG. 6 illustrates an overview flowchart for a process for feature pre-processing for machine-assisted similarity discovery in accordance with one or more of the various embodiments.

FIG. 6 illustrates an overview flowchart for process 600 for feature pre-processing for machine-assisted similarity discovery in accordance with one or more of the various embodiments. After a start block, at block 602, in one or more of the various embodiments, the raw data may be provided to the modeling platform. In one or more of the various embodiments, data used for generating model objects or similarity models may be collected from various sources. The format or content of the raw data may vary widely depending on a given application.

In at least one of the various embodiments, raw data sets may be comprised of files, database dumps, database result sets, inventory lists, payroll records, log files, or the like, or combination thereof. In at least one of the various embodiments, the raw data sets may be provided via a network, file system, database/service API, or the like, or combination thereof. In some embodiments, raw data sets may be provided by one or more source data servers, such as source data server computer 118, or the like. In at least one of the various embodiments, source data servers may be communicated with over a network, such as, network 110 or wireless network 108.

At block 604, in one or more of the various embodiments, an attribute engine may be arranged to provide one or more model objects based on the raw data. Accordingly, in one or more of the various embodiments, the attribute engine may be arranged to process the raw data to provide one or more model object types and model objects.

In one or more of the various embodiments, model objects may be generated based on the original structure or format of the raw data set. For example, in one or more of the various embodiments, if the raw data is a database export file from a SQL database, the model objects may correspond to one or more tables included in the database export file. In other embodiments, if the raw data is structured data using XML, JSON, or the like, the structure or selection of the model objects may be taken directly from the structure of the raw data.

In one or more of the various embodiments, the accuracy of automatic machine based production of model objects (from raw data) may correlate to the level of structural definition or information that the raw data includes. Accordingly, in some embodiments, raw data that may be structured using well-known formats may be more likely to be successfully ingested without significant pre-processing or user intervention. Further, in one or more of the various embodiments, raw data that may be provided with meta-data such as data schemas, ontology information, mapping information, or the like, may be easier to ingest accurately than raw data provided without meta-information that describes the structure of the raw data.

In one or more of the various embodiments, some raw data may be insufficiently structured to automatically determine model objects. Accordingly, one or more ingestion rules or other configuration information may be provided for such raw data sets. In some embodiments, the particular ingestion rules may depend on the content or format of the data as well as the intended application of the model objects or similarity models that will be based on those model objects. For example, one or more users may be tasked with developing scripts or programs that may be used for ingestion of unstructured raw data.

At block 606, in one or more of the various embodiments, a feature set may be provided based on the model objects created from the raw data ingestion. In one or more of the various embodiments, model object types may be associated with one or more features or one or more feature types. In one or more of the various embodiments, features may be identified directly from model objects.

In one or more of the various embodiments, during the ingestion of the raw data, one or more features may be identified as being associated with a given model object. For example, in some embodiments, if the model objects are generated based on database export files or database schema files, the model objects may correspond to one or more tables with their features corresponding to table columns for a one or more tables. Likewise, in one or more of the various embodiments, other structural information included in the raw data may be initially relied upon to determine model object features. For example, in some embodiments, if the raw data is XML files, one or more top level elements may correspond to model objects with one or more sub-elements defining the features for each model object.

At block 608, in one or more of the various embodiments, one or more additional features may be provided based on one or more other features. In one or more of the various embodiments, the features automatically identified by the attribute engine or modeling platform may be insufficient to represent attributes a user may be interested in analyzing or modeling. Accordingly, in one or more of the various embodiments, the modeling platform may enable users to define new or additional model object features based on one or more of the features that may have been automatically discovered by the attribute engine.

In one or more of the various embodiments, a user-interface may be arranged to enable users to group features or feature values to provide additional or modified features for model objects. For example, if a feature, such as an environment temperature, is automatically identified from the raw data, a user may decide to include a new feature representing defined temperature ranges, such as high temperature, medium temperature, low temperature, or the like. Accordingly, in this example, for one or more of the various embodiments, one or more rules may be defined to the augment some model objects by including a temperature range feature maps temperature values to particular values, such as, mapping 0-20 Celsius degrees to Low, 21-30 Celsius degrees to Medium, and so on. Similarly, for example, if features representing dimensions, such as, height, width, and depth are automatically identified from the raw data, rules may be defined to include a feature named volume based on the height, weight, and depth. One or ordinary skill in the art will appreciate that various mapping processes may be executed based on configuration information or rules that may be executed by an attribute engine, or the like.

In one or more of the various embodiments, one or more raw objects may represent the same concept differently (e.g., using different features or different feature values). Accordingly, in one or more of the various embodiments, an attribute engine may be arranged to coalesce disparate features or feature values into one feature or feature value. For example, in one or more of the various embodiments, if different raw objects represent the same feature using different or inconsistent values, the attribute engine may be arranged to "normalize" the feature or feature values. For example, in some embodiments, if raw objects include a color feature, values such as, red, crimson, ruby, vermillion, or the like, may be normalized to a common value, such as red. Accordingly, in this example, for some embodiments, an attribute engine may be arranged to add a feature labeled 'color base' where configuration rules are executed by an attribute engine to map colors to their primary color.

Note, one of ordinary skill in the art will appreciate that these examples are non-limiting. As such, various rules may be arranged to automatically add features for a variety of reasons based on the application.

Also, in one or more of the various embodiments, attribute engines may be arranged to automatically add features or feature values, such as, time stamps, dates, other metadata, or the like, to model objects during raw data pre-processing.

In one or more of the various embodiments, an attribute engine may be arranged to modify a feature included in the raw dataset to define one or more new features. For instance, in some embodiments, the different values of the feature can be clustered, each cluster becoming a new feature. For example, in some embodiments, raw data on diseases may be grouped into three clusters, thus obtaining three features, such as, life-threatening diseases, life-long conditions and temporary diseases, instead of one feature.

Accordingly, the modeling platform may be arranged to provide similarity models that may be used to compare patient model objects using the new features separately. Also, in some embodiments, if feature-based similarities are added to a similarity task, one can give different weights (e.g., different values for the coefficients) to the three new features: for example, the life threatening diseases may be weighted higher than non-life threatening diseases and count more in the final similarity measure. For example, two patients having AIDS may be considered more similar to each other than two patients having bone fractures (at identical values for all the other features).

In one or more of the various embodiments, another situation where new features may be created may be where several characterizations of the objects may be inferred from one single feature f. For instance, one can choose to model the object-feature relationship by a graph and compute different properties for the vertices in the graph. If in some embodiments the initial objects are vertices in the graph, each one of them will have several new properties, extracted by the graph analysis. Each one of the properties can then be viewed as a new feature. For example, given of the objects of type "movie" and their feature "actor". This feature has a set of categorical values for each object: a movie has several actors. Accordingly, similarities between movies based on the feature "actor" may be computed. In some embodiments, the similarity engine may be arranged to take into account the actors that two movies have in common when computing their similarity. However, in some embodiments, two movies may be considered similar if their actors are as popular or belong to a same group or class of actors, even though they are not the same. This kind of characterization (popularity, group) may be obtained by modeling the movies-actors relationship with a graph model. Accordingly, in some embodiments, a similarity engine may be arranged to provide a bipartite graph where the vertices correspond to the movies and to the actors, while the edges correspond to the relation: "actor a played in movie m". Alternatively, in some embodiments, a non-bipartite graph may be defined where the vertices of the graph may be the movies and the edges may correspond to the actors they have in common (the weight of the edge may be equal to the number of common actors). In either one of these graph model, several properties of the vertices can be computed, for clarity some are described below.

In one or more of the various embodiments, connected components may be discovered such that connected components may be groups of vertices connected by a path in the graph model where the similarity engine may traverse from one vertex in the group to any other vertex in the group by following the edges in the graph. For example, in some embodiments, two movies may be considered to belong to the same connected component if they have common actors or their actors played in the same movie or their actors played with actors who played in the same movie etc.

In one or more of the various embodiments, two movies in two different connected components may have very different sets of actors e.g. American actors for one, Indian actors for the other one. In some embodiments, arranging the modeling platform to employ connected components improves the computing performance of similarity matching since similarity may be computed in linear time using breath-first-search or depth-first-search traversals to discover the connected components in $O(n+m)$ time, where n is the number of vertices in the graph and m is the number of edges.

In one or more of the various embodiments, communities may be defined as groups of vertices connected by a high number of edges. Accordingly, there may be a much higher number of edges between the vertices in the community than between the vertices in the community and the other vertices in the data model. For example, two movies in the same community may belong to the same group of movies that share a high number of actors. In some embodiments, employing communities may be an improvement and refinement to using the connected components described above, such that a connected component can have several communities but a community may not span several connected components. However, in some embodiments, communities may not be as well defined as the connected components: different well-known algorithms proposed for the computation of communities may give different results. For example, mapping model objects to communities of vertices that could belong to any one of several communities may occur because in an absence of strong links to any one of the communities.

In one or more of the various embodiments, centrality represents the level of centrality for vertices in a data model. Accordingly, several definitions or algorithms have been applied to discover how central vertices are in a graph model. For example, the well-known PageRank algorithm considers that vertices in a graph model may have a high rank (which can be seen as a measure of centrality or importance of vertices) if they are connected to other highly ranked vertices. The PageRank algorithm runs in $O(n+m)k$ time where k is the number of iterations needed by the algorithm to converge (typically $k<30$). Likewise, in some embodiments, the betweenness centrality may be used measure how many times vertices are situated on the shortest paths between pairs of other vertices in the graph model. The best known betweenness algorithm computes the betweenness centrality of all the vertices of the graph in time $O(nm)$ if the graph model is unweighted and $O(nm+n^2 \log(n))$ if the graph model is weighted. Further, for some embodiments, the closeness centrality algorithm may be employed to compute the average distance between each vertex and all of the other vertices in the graph model. Accordingly, in some embodiments, closeness centrality may be computed in $O(n(m+n))$ for an unweighted graph and in $O(n^3)$ for a weighted one.

Also, in one or more of the various embodiments, similarity engines may be arranged to discover several other properties of vertices in a graph model composed of model objects. For example, in some embodiments, the number of triangles a vertex belongs to or the number of given patterns in its neighborhood are examples of such properties that may be added as model object features depending on the how graph model may be defined.

At block 610, in one or more of the various embodiments, one or more features may be transformed according to one or more rules or user input. In one or more of the various embodiments, attribute engines may be arranged to apply one or more rules for automatically transforming features or feature values. For example, in some embodiments, rules may be arranged perform various conversions, such as: currency conversions, rounding/truncating numbers, converting temperate measurements from Fahrenheit to Celsius; formatting telephone numbers, formatting mailing addresses, formatting email addresses; or the like.

Note, one of ordinary skill in the art will appreciate these examples are non-limiting. As such, various rules may be arranged to automatically perform feature value transformations for a variety of reasons based on the application that similarity models are designed for.

In one or more of the various embodiments, a similarity engine or attribute engine may be arranged to apply one or more rules to transform or otherwise modify the model objects or model object sets before the actual computation of similarities. For example, in one or more of the various embodiments, the similarity engine may be arranged to identify outliers and determine if they should be used to generate a similarity model. Other determinations may include, determining if feature values should be normalized such that extreme values become less extreme. For instance, in some embodiments, a similarity engine or attribute engine may be arranged to perform actions including: several transformations to rebalance skewed distributions of continuous values; replacing the real values by their square roots or their logarithms; or, for features that are n-dimensional vectors, the different dimensions may be normalized to have the same mean and the same variance, or the like.

Also, in one or more of the various embodiments, a similarity engine may be arranged to discover if there may be one or more features that may be missing values for several objects. Accordingly, in one or more of the various embodiments, the similarity engine or attribute engine may be arranged to replace the missing values by one or more defined default values. For example, in some embodiments, if the feature has only one value per model object and the value is continuous, the default value may be defined to be the median of the values taken by the feature for the other model objects. Note that the computation of the median value takes $O(n \log(n))$ time where n is the number of objects that do not have a missing value for the given feature. For the case where the feature has only one value per model object and this value is categorical, the modeling platform may be arranged to define the default feature value to be the category value that has the highest number of occurrences in the dataset.

Accordingly, in one or more of the various embodiments, the replacement of missing values by default ones enables the similarity engine to have a similarity value for each feature for each pair of model objects. However, in some embodiments, including default values for missing feature value may give the impression that some model objects are more similar for a given feature (because they have the default value or a value close to the default one) than they really are. In some embodiments, this bias may be mitigated by including a "confidence score" between 0 and 1 that measures how confident the similarity engine is about the accuracy of default values. Accordingly, in some embodiments, this confidence score may be used if discovering the similarity between model objects, such that, if one model object has a default value for a feature, the resulting similarity computed for that model object and that feature may be multiplied by the confidence score.

Also, in one or more of the various embodiments, a similarity engine or attribute engine may be arranged to weight the values of a given feature such that some values are given more importance than others (and thus count more in the feature-based similarity). For example, in some embodiments, given a feature that has a set of categorical values, the similarity engine may be arranged to compute, for each one of the values, its total number of occurrences in the dataset. Then, for this example, a weighting value may be defined as:

$$\text{weight}(v) = \log \frac{\text{no. objects}}{\text{no. objects with value } v}.$$

For some embodiments, this corresponds to the IDF (inverse document frequency), a weighting scheme that is often used in the computation of distances or similarities between text documents. In some embodiments, this weighting may be applied to medical procedures for instance, where two patients may be considered more similar to each other if they underwent a same uncommon procedure than if they had the same very common procedure.

In one or more of the various embodiments, similarity engines or attribute engines may be arranged to transform feature values where the data may be a single continuous value whose distribution is not flat. In some embodiments, such feature values may be normal, positively skewed, or negatively skewed. in one or more of the various embodiments, an important characteristic may be that the feature values may be clustered around a given value, such as, the mean for the normal distribution, the left side for the positively skewed one and the right side for the negatively skewed distribution.

For example, in some embodiments, in a movie dataset, the feature "year" may be negatively skewed (e.g., there may be many more recent movies than old movies), the feature "number of ratings" may be positively skewed (e.g., there may be more unpopular movies than popular ones) and the feature "users score" may be approximately normal. Accordingly, in this example, if the similarity engine is arranged to employ the values of these features as they are, in some embodiments, two very popular movies (high number of ratings) may not be very similar. In some embodiments, this may happen because these movies may be in the long tail of the distribution where the values are high and not very close. The may same happen for two old movies or for two movies that have very high user ratings. In one or more of the various embodiments, if the similarity engine is to consider these model objects similar, the values of the feature may be transformed to obtain a less "bumpy" curve. Accordingly, for some embodiments, the similarity engine may be arranged to sort the values of the feature and replace them with their rank in a defined ordering (if a value is present several times, the average of its ranks may be used).

Note, one of ordinary skill in the art will appreciate that these examples are non-limiting. As such, various rules may be arranged to automatically perform feature value transformations for a variety of reasons based on the application.

At decision block 612, in one or more of the various embodiments, if feature processing is complete, control may be returned to a calling process; otherwise, control may loop back to block 608. Next, control may be may be returned to a calling process.

Figure 7:
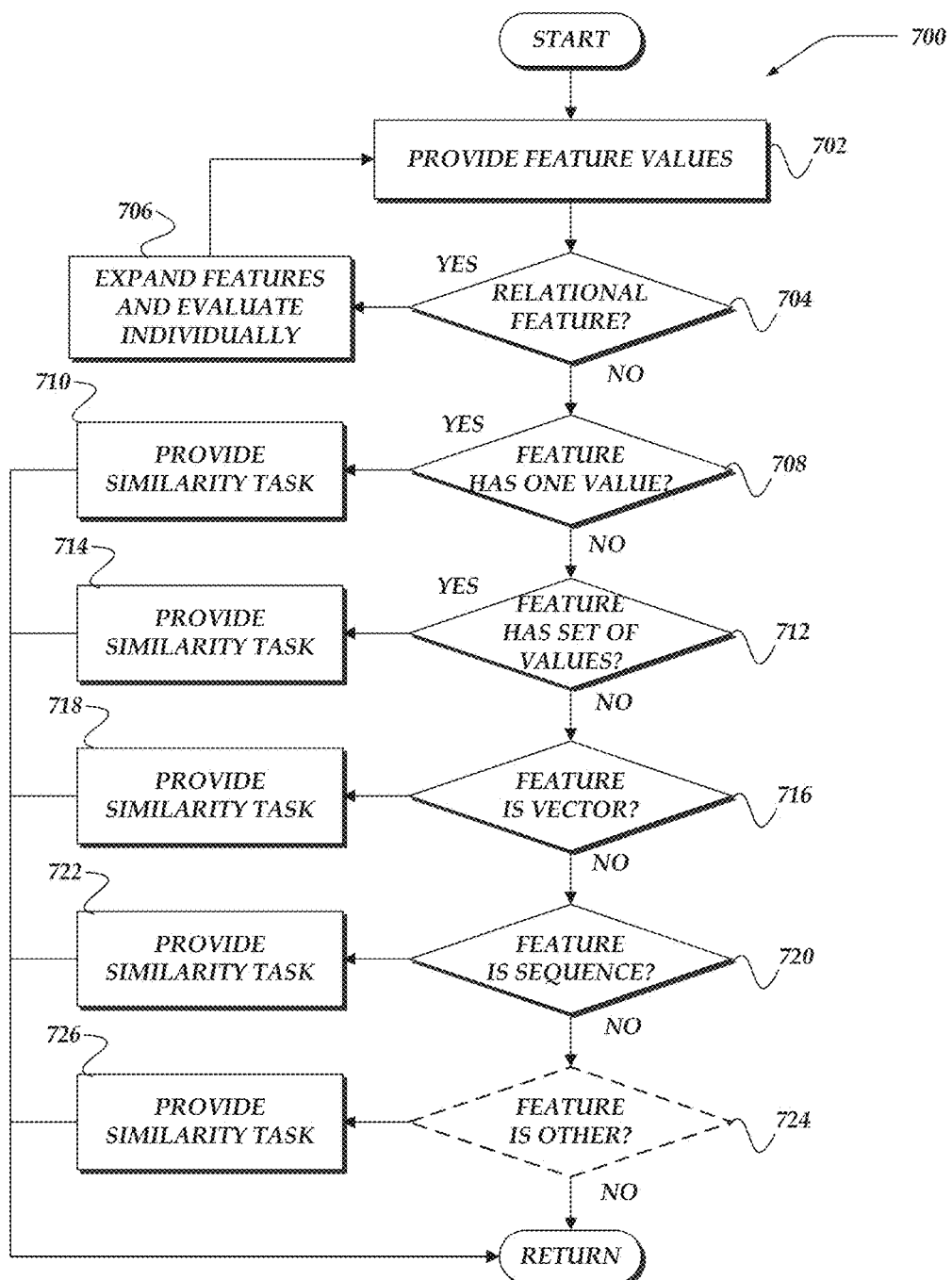
FIG. 7 illustrates a flowchart for a process for selecting feature-based similarity tasks for machine-assisted similarity discovery in accordance with one or more of the various embodiments.

FIG. 7 illustrates a flowchart for process 700 for selecting feature-based similarity tasks for machine-assisted similarity discovery in accordance with one or more of the various embodiments. After a start block, at block 702, in one or more of the various embodiments, values for particular features of a model object may be provided to a similarity engine, such as, similarity engine 324. In one or more of the various embodiments, similarity engines may be arranged to analyze, interpret, or parse, model object features to select a similarity task that may be appropriate comparing a given feature type.

At decision block 704, in one or more of the various embodiments, if the feature value represents one or more other model objects, control may flow to block 706; otherwise control may flow to decision block 708.

In one or more of the various embodiments, before the similarity engine may compute the feature-based similarity between two model objects for a particular feature, it may be arranged to check if a feature is a simple feature or a relational feature. If the feature is a simple feature, the feature values in the two model objects may be used.

However, in some embodiments, if a feature may be a relational feature, where the values of that feature are themselves model objects. Accordingly, in some embodiments, the values of the feature may be considered to have a model object type and a set of features characterizing them. Thus, in one or more of the various embodiments, the similarity engine may be arranged to employ these sub-features in to compute the similarity of the feature for two model objects.

Accordingly, in one or more of the various embodiments, the similarity engine may be arranged to compute the similarities between all the objects comprising the model feature using the approach presented below. In one or more of the various embodiments, this may provide a similarity between all the model objects corresponding to a relational feature. These similarities may be employed to compute a similarity value for the relational feature for the model objects.

In one or more of the various embodiments, the similarity engine may be arranged to use the values of the model object feature to compute a similarity score, while for relational features, the similarity engine may be arranged to use the similarities between the values of the relational feature.

At block 706, in one or more of the various embodiments, the similarity engine may expand the feature. In one or more of the various embodiments, one or more features of a model object may be a model object. Accordingly, in some embodiments, the similarity engine may be arranged to expand the features that are model objects into the features that comprise the feature model object. Accordingly, in some embodiments, the combined similarity task for a relational feature may be a combination of similarity tasks for the model objects that comprise the relational feature. Next, the control may loop back to block 702 for processing of the one or more model objects that comprise the relational feature.

At decision block 708, in one or more of the various embodiments, if the feature has a single value rather than being a collection of values, control may flow to block 710; otherwise, control may flow decision block 712.

At block 710, in one or more of the various embodiments, the similarity engine may be arranged to provide a similarity task for the single-valued feature. In one or more of the various embodiments, if the feature is single-valued, the similarity engine may be arranged to compute similarity for the feature as follows. Let f (obj) denote the values taken by the feature f for the model object obj. In the case where the feature f of the type t takes only one value, |f(obj)|=1. The similarity of the model object feature $sim_f(obj_1, obj_2)$ may be computed differently depending on if the feature value is categorical, continuous or a model object.

categorical $$sim_f(obj_1, obj_2) = \gamma(f(obj_1), f(obj_2))$$

where $\gamma(u, v) = 1$ if $u = v$ and $0$ otherwise continuous $$sim_f(obj_1, obj_2) = 1 - \frac{|f(obj_1) - f(obj_2)|}{maxDiff}$$

where $maxDiff = max_{obj_i, obj_j \in T} (|f(obj_i) - f(obj_j)|)$.

object $$sim_f(obj_1, obj_2) = \frac{sim'(f(obj_1), f(obj_2))}{maxSim}$$

where $maxSim =$ $max(sim'(obj'_1, obj'_2))$ for all $obj'_1$ and $obj'_2$ of type $t'$.

Next, control may be returned to a calling process.

At decision block 712, in one or more of the various embodiments, if the feature may include a set of values, control may flow to block 714; otherwise, control may flow to decision block 716. In one or more of the various embodiments, a model object feature, f (obj) is a set of values where each value is present once and the order is not important (it may be considered a bag of values).

At block 714, in one or more of the various embodiments, the similarity engine may be arranged to provide a similarity task for the feature comprised of a set of values.

In one or more of the various embodiments, model object feature/(obj) may be a set of values where each value is present only once and the order is not important. More formally, the value of a model object feature f for an object $obj_i$ is $f(obj_i)=\{v_{i1}, v_{i2}, \ldots v_{id}\}$ where the values $v_{i1}, v_{i2}, \ldots v_{id}$ may be permuted and $v_{iu} \neq v_{iv}$, for all i, u, v.

If the values of the model object feature f are categorical, one has: $f(obj_1)=\{v_{11}, v_{12}, \ldots v_{1n}\}$ and $f(obj_2)=\{v_{21}, v_{22}, \ldots v_{2n}\}$, with $v_{ij}$ being categorical feature values. Accordingly, in one or more of the various embodiments, the similarity may be arranged use one or more similarity tasks such as:

Jaccard similarity $$sim_f(obj_1, obj_2) = \frac{|f(obj_1) \cap f(obj_2)|}{|f(obj_1) \cup f(obj_2)|}.$$

The similarity score is thus the number of elements in common divided by the total number of elements (common elements being counted only once).

Sorensen similarity $$sim_f(obj_1, obj_2) = \frac{2 \cdot |f(obj|_1) \cap f(obj_2)|}{|f(obj'_1)| + |f(obj'_2)|}.$$

This similarity task is very similar to Jaccard, but it may be arranged to give more weight to the common items.

In one or more of the various embodiments, if the values of the model feature f may be continuous, the similarity engine may be arranged to compute a pairwise similarity between the values in the set $f(obj_1)$ and those in the set $f(obj_2)$ using a similarity task for continuous values described above for block 710. Then the method used for the case where the values off are sets of objects, as described below may be used provide similarity task for the set of features.

In one or more of the various embodiments, if the values of the model object feature f are objects, one has: f $(obj_1)=\{obj'_{11}, obj'_{12}, \ldots obj'_{1n}\}$ and $f(obj_2)=\{obj'_{21}, obj'_{22}, \ldots obj'_{2m}\}$, with $obj'_{ij}$ being objects of type t'. Even though the objects $obj'_{ij}$ could be interpreted as categorical values and the similarity score $sim_f (obj_1, obj_2)$ could be computed using the Jaccard similarity shown above, similarity engine may be arranged to leverage the fact that the model objects $obj'_{ij}$ have features of their own, enabling the similarity engine to be arranged allowing to compute a similarity between them. Accordingly, let $sim'(obj'_1, obj'_2)$ be the similarity between any two model objects $obj'_1, obj'_2$ that has previously been computed. Thus, in some embodiments, a similarity score provided for each model object in the set f $(obj_1)$ and each object in the set f $(obj_2)$ may be employed to enable the similarity engine to compute the similarity $sim_f (obj_1, obj_2)$.

In one or more of the various embodiments, where $\gamma:f (obj_1) \rightarrow f(obj_2)$ may be a function that maps objects in the first set to objects in the second set such that each object in the first set is mapped to at most one object in the second set (injection) and no object in the second set has more than one object mapped to it. Based on this definition, the similarity $sim_f (obj_1, obj_2)$ may be defined using different approaches described below.

In one or more of the various embodiments, the similarity engine may be arranged to find the function $\gamma$ that maximizes the sum of similarities $\Sigma_{obj' \in f(obj_1)} \varphi(obj')$ (e.g., find the best global matching between the objects in f $(obj_1)$ and the objects in f $(obj_2)$. This is actually the problem of the best matching in a weighted bipartite graph: the vertices of the graph correspond to the model objects in the two sets, the edges correspond to all the possible mappings from objects in f $(obj_1)$ to objects in f $(obj_2)$ and the weights correspond to the similarities between these model objects. This problem can be solved in polynomial time with a $O(n \cdot m + n^2 \log(n))$ algorithm, where n may be the number of vertices in the graph and m may be the number of edges. In some embodiments, the number of edges may be proportional to $n^2$ (as similarities between all model objects from one set and all model objects from the other set are computed), leading to a total complexity of $O(n^3)$. In some embodiments, this complexity may be acceptable for small sets; for instance, it can be used for the sets of diseases of patients, given that a patient has at most a dozen diseases. For larger sets, an approximate algorithm with a smaller complexity may be used. Note, however that even an approximate algorithm may have a complexity of at least $O(n^2)$ since the similarities between all pairs of model objects from the two sets need to be computed.

In one or more of the various embodiments, the similarity engine may be arranged to employ the following greedy algorithm as an approximate algorithm:
let V1 be the vertices corresponding to objects in f (obj1) and
let V2 be the vertices corresponding to objects in f (obj2). Without loss of generality, suppose that $|V1| \le |V2|$
Let s=0 (it will contain the approximate sum of similarities).
while V1 is not empty do
   select the edge that has the highest weight
   remove the edge and its adjacent vertices from the graph
end This algorithm has a complexity of $O(n^2 \log(n))$ as the edges must be sorted prior to performing the selection. The result is not necessarily the best matching.

In some embodiments, given a function $\varphi$ the similarity engine may be arranged to employ function for computing $sim_f(obj_1, obj_2)$ as:

$$sim_f(obj_1, obj_2) = \frac{\sum_{obj' \in f(obj_1)} sim'(obj', \varphi(obj'))}{|f(obj_1)| + |f(obj_2)| - \sum_{obj' \in f(obj_1)} sim'(obj', \varphi(obj'))}.$$

In some embodiments, this function reaches its maximal value of 1 if the values in the set $f(obj_1)$ are identical to the ones in $f(obj_2)$ (supposing that the function $\varphi$ puts together the identical values of the two sets, which the two algorithms above do).

In one or more of the various embodiments, instead of taking into account all the mappings between model objects when computing the similarity $sim_f(obj_1, obj_2)$, the similarity engine may be arranged to use the k most similar pairs of model objects only. If k=1, only the similarity of the two most similar objects may be used. Let $s_k$ be the sum of these top k similarities. If the algorithm for computing the best matching in a weighted bipartite graph is used, the sum $s_k$ may be computed by selecting the k pairs $(obj_1, \varphi\ obj_2)$ with the greatest values once the algorithm has finished. If the greedy algorithm is used, one can stop as soon as k edges have been selected. The similarity is then defined as:

$$sim_f(obj_1, obj_2) = \begin{cases} \frac{s_k}{2 \cdot k - s_k} & \text{if} \quad |f(obj_1)| + |f(obj_2)| \ge 2 \cdot k \\ \frac{s_k}{|f(obj_1)| + |f(obj_2)| - s_k} & \text{otherwise} \end{cases}$$

In one or more of the various embodiments, this second approach considers that two model objects may be similar if they have a similar subgroup. In some embodiments, it may be arranged to be indifferent to their respective numbers of model objects and to how different their other model objects may be. For example, in some embodiments, a similarity engine may be arranged to employ this approach for the task of identifying similar motion picture directors where two directors two directors may be considered similar if they have several (k) very similar movies, no matter how many movies each one of them did and how little similar these other movies are.

However, in some embodiments, for the task of finding similar patients, a similarity engine may be arranged to take into account the number of diseases each patient has and how different their diseases are if computing similarities. In one or more of the various embodiments, a similarity engine may be arranged to employ a particular approach based on the application and the model objects or data sets involved in the process. For example, in one or more of the various embodiments, the similarity engine may be arranged to execute one or more rules or configuration information to select a particular approach. Further, in one or more of the various embodiments, a user-interface may be arranged and made available to enable a user to select or recommend one or more approaches as well rather than just relying on pre-configured rules or configuration. Next, control may be returned to a calling process.

At decision block 716, in one or more of the various embodiments, if the feature is a vector, control may to block 718; otherwise, control may flow decision block 720. In one or more of the various embodiments, a model object feature may be considered a vector, if the value of a model object feature f for a model object obj of type t is $f(obj_1) = \{v_{i1}, v_{i2}, \ldots v_{id}\}$. The values $v_{i1}, v_{i2}, \ldots v_{id}$ can be permuted, but the same permutation must be used for all the objects of type t. Also, the length of the vector is the same for all the objects of type t and the feature values in the vector are of the same type (all categorical, continuous or objects of a same type).

At block 718, in one or more of the various embodiments, the similarity engine may be arranged to provide a similarity task for features that may be vectors.

In one or more of the various embodiments, if the model object feature values are categorical, the similarity engine may be arranged to compute the feature-based similarity as:

$$sim_f(obj_1, obj_2) = \frac{\sum_{i=1,\ldots d} \gamma(v_{1i}, v_{2i})}{d}$$

where, as before, $\gamma(u, v) = 1$ if u=v and 0 otherwise. Note that this situation may be considered a special case of the categorical case described above, where all the common elements may be counted, while here the element types may have to be the same and in the same position to be counted.

In one or more of the various embodiments, if the feature values are continuous, different similarity tasks can be used:

cosine similarity.

$$sim_f(obj_1, obj_2) = \frac{\sum_{i=1,\ldots d} (v_{1i} \cdot v_{2i})}{|f(obj_1)|_2 \cdot |f(obj_2)|_2}$$

where $|u|_2$ is the 2-norm of vector u computed as: $|u|_2 = \sqrt{\sum_{i=1,\ldots d} u_i^2}$ pairwise Jaccard similarity (also called weighted Jaccard similarity [10]):

$$sim_f(obj_1, obj_2) = \frac{\sum_{i=1,...d} \min(v_{1i} \cdot v_{2i})}{\sum_{i=1,...d} \max(v_{1i} \cdot v_{2i})}$$

In one or more of the various embodiments, the similarity engine may be arranged to employ other similarity tasks defined based on different distance functions, such as:

Euclidian distance:

$$dist_f(obj_1, obj_2) = \sqrt{\sum_{i=1,...d} (v_{1i} - v_{2i})^2}$$

cityblock distance (also called Manhattan distance):

$$dist_f(obj_1, obj_2) = \sum_{i=1,...d} |v_{1i} - v_{2i}|$$

Minkowski distance:

$$dist_f(obj_1, obj_2) = \left( \sum_{i=1,...d} (|v_{1i} - v_{2i}|)^p \right)^{1/p}$$

Accordingly, in some embodiments, given a distance function $dist_f$ between model objects, a similarity task may be defined as:

$$sim_f(obj_1, obj_2) = 1 - \frac{dist_f(obj_1, obj_2)}{\max Diff} \text{ where } \max Diff =$$

$$\max_{obj_i, obj_j \in T} dist_f(obj_i, obj_j) \text{ or as } sim_f(obj_1, obj_2) =$$

$$\frac{1}{1 + dist_f(obj_1, obj_2)}.$$

Next, control may be returned to a calling process.

At decision block 720, in one or more of the various embodiments, if the feature is a sequence, control may flow to block 722; otherwise control may flow to decision block 724.

In one or more of the various embodiments, the similarity engine may be arranged to identify sequences where the value of a feature f for a model object $obj_i$ is $f(obj_i) = \{s_{i1}, s_{i2}, \ldots s_{id}\}$. The values $s_{i1}, s_{i2} \ldots s_{id}$ cannot be permuted—the way the values succeed each other is considered an important characteristic of a sequence At block 722, in one or more of the various embodiments, the similarity engine may be arranged to provide a similarity task for the feature comprised of a sequence of values. In some embodiments, the number of values in the sequence does not need to be the same for all objects.

In one or more of the various embodiments, the similarity engine may be arranged to compute similarity for sequence based features using a dynamic programming approach. In one or more of the various embodiments, if the feature values are categorical similarity may be measured by finding the longest common subsequence in two sequences. In some embodiments, this problem may be solved by dynamic programming. Accordingly, let C(i,j) be the longest common sequence between the first i elements of the first sequence $s_1$ and the first j elements of the second sequence $s_2$. Thus, in some embodiments, the similarity engine may be arranged to discover the longest sequence using algorithms that implement the following formula:

$$C(i, j) = \begin{cases} 0 & \text{if } i = 0 \text{ or } j = 0 \\ C(i-1, j-1) + 1 & \text{if } s_{1i} = s_{2j} \\ \max(C(i, j-1), C(i-1, j)) & \text{otherwise} \end{cases}$$

In some embodiments, if the longest common subsequence has been computed, the resulting value may be normalized to provide a similarity measure between 0 and 1. For example, let $l_1$ be the length of the sequence $f(obj_1)$ and $l_2$ be the length of the sequence $f(obj_2)$. Thus, in this example, similarity may be computed using:

$$sim_f(obj_1, obj_2) = \frac{C(l_1, l_2)}{l_1 + l_2 - C(l_1, l_2)}$$

In one or more of the various embodiments, the similarity engine may be arranged to process sequences of continuous values or objects. For the case of sequences of objects, one has $sim(s_{1i}, s_{2j}) = sim'(obj'_1, obj'_2)$ (there is a similarity measure between the elements of one sequence and the elements of the other one). For the case of continuous values, $sim(s_{1i}, s_{2j})$ may be computed using the process described above for continuous single-valued features (where the denominator may be computed using all the values in the sequences of all the objects under consideration. Accordingly, in one or more of the various embodiments, the similarity engine may be arranged to execute:

$$C(i, j) \begin{cases} 0 \text{ if } i = 0 \text{ or } j = 0 \\ \max \begin{pmatrix} C(i, j-1) \\ C(i-1, j) \\ C(i-1, j-1) + sim(s_{1i}, s_{2j}) \end{pmatrix} \text{otherwise} \end{cases}$$

the previous definition for $sim_f(obj_1, obj_2)$ still holds.

In some embodiments, a similarity engine may be arranged to process model object features that include a sequence of sets of values (instead of a sequence of values): $f(obj_i) = (s_{i1}, s_{i2}, \ldots s_{id})$, where $s_{ij}$ is a set of values. Thus, the order of is important, while the order inside each set $s_{ij}$ is not. This situation corresponds for instance to the case of patients' diseases where each patient may have a sequence of visits to the doctor and each visit has a set of diseases. In one or more of the various embodiments, the similarity engine may be arranged to compute the similarity between visits to the doctors using their sets of diseases. This may provide the value $sim(s_{iu}, s_{jv})$ for every two elements $s_{iu}, s_{jv}$ in the two sequences $f(obj_i), f(obj_j)$. Accordingly, the formula discussed directly above may be used in the same way as before. However, this easy solution might not be the best one. We might want to be able to map a set in the first sequence (e.g. a visit to the doctor) to several sets in the second sequence, while the elements in the different sets are not mapped more than once (each disease from the first patient is mapped to at most one disease from the second patient). Accordingly, in some embodiments, the similarity engine may be arranged to execute the following algorithm to compute similarity for some sequences of sets:

For each set in the first sequence s1 do:
  compute all permutations of the elements in the set
  For each permutation σ1 of the first set in $s_1$, $\sigma_2$ of the second set in $s_1$ . . .
    defines as the sequence containing the values of $s_1$ as permuted by $\sigma_1, \sigma_2, \ldots$
  For each sequence s thus defined, compute sim(s, s2) using the formula:

$$C(i,j) \begin{cases} 0 \text{ if } i=0 \text{ or } j=0 \\ \max\begin{pmatrix} C(i, j-1) \\ C(i-1, j) \\ C(i-1, j-1) + sim(s_{1i}, s_{2j}) \end{pmatrix} \text{ otherwise} \end{cases}$$

the previous definition for $sim_f(obj_1, obj_2)$ still holds.

Return the maximal similarity thus computed. Next, control may be returned to a calling process.

At decision block 724, in one or more of the various embodiments, optionally, if the feature is another type of feature, control may flow to block 726; other control may be returned a calling process.

In one or more of the various embodiments, this decision block may be considered optional because embodiments may be arranged to ignore or discard features that may not be classified into an expected class of feature. However, in some cases, a similarity engine may be arranged to include additional feature classifiers for additional feature types.

At block 726, in one or more of the various embodiments, similarity engines may be arranged to provide similarity tasks for additional features based on their values or value types. In one or more of the various embodiments, the similarity engine may be arranged to employ one or more rules or other configuration information to select particular similarity tasks for unhandled feature types. For example, the similarity engine may be arranged to execute one or more user defined rules to select particular similarity tasks more applicable to their datasets or model objects. Next, control may be returned to a calling process.

Figure 8:
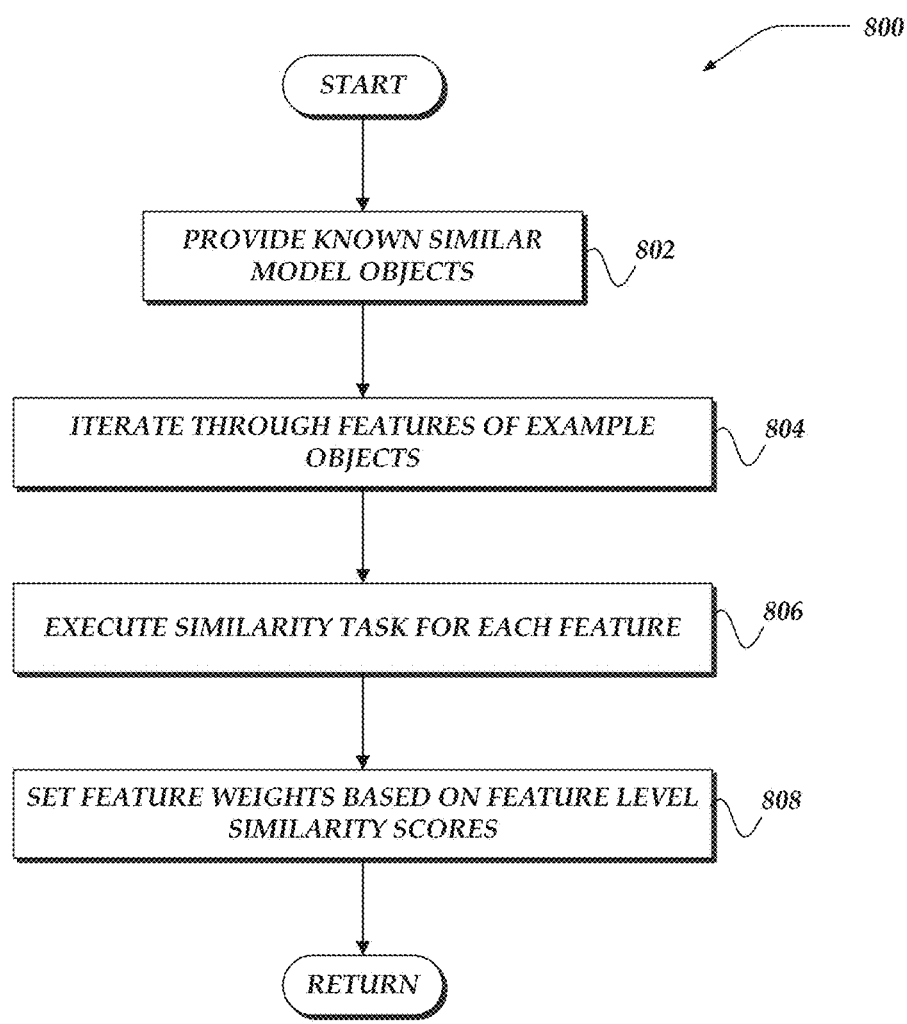
FIG. 8 illustrates a flowchart for a process for training feature-based similarity models for machine-assisted similarity discovery in accordance with one or more of the various embodiments.

FIG. 8 illustrates a flowchart for process 800 for training feature-based similarity models for machine-assisted similarity discovery in accordance with one or more of the various embodiments. After a start block, at block 802, in one or more of the various embodiments, one or more model objects that a user considers to be similar to each other may be provided to a similarity engine. At block 804, in one or more of the various embodiments, the similarity engine may be arranged to iterate over the features of the example model objects.

At block 806, in one or more of the various embodiments, the similarity engine may be arranged to execute a similarity task for each feature. In one or more of the various embodiments, the particular similarity task may be selected based on a combination of the type of features, the data sets, the expected application of the models being produced, or the like, as described above.

At block 808, in one or more of the various embodiments, the similarity engine may be arranged to establish feature weights for the similarity model based on the determined feature level similarity scores. Next, control may be returned to a calling process.

Figure 9:
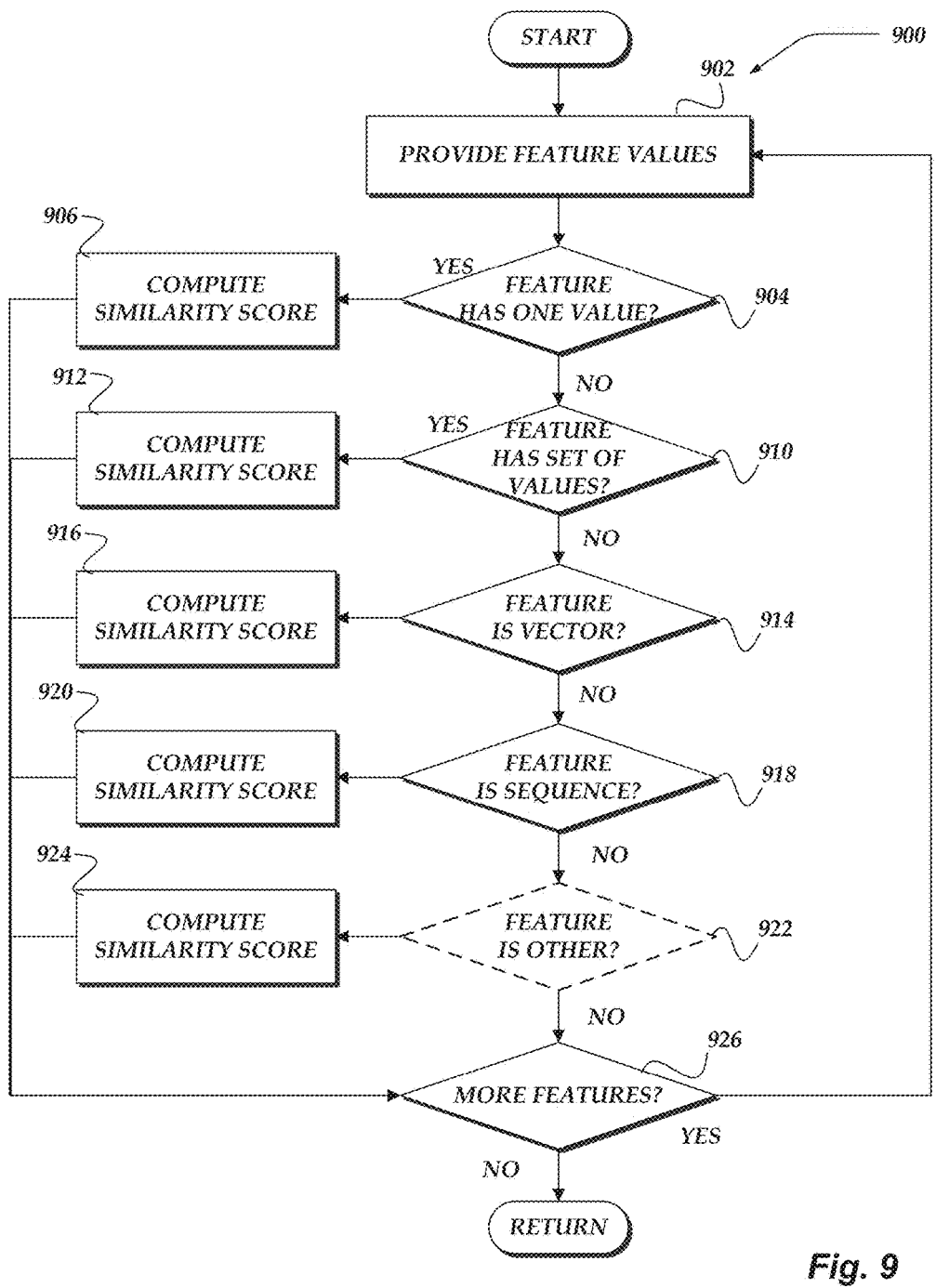
FIG. 9 illustrates a flowchart for a process for generating feature level similarity scores for machine-assisted similarity discovery in accordance with one or more of the various embodiments.

FIG. 9 illustrates a flowchart for process 900 for generating feature level similarity scores for machine-assisted similarity discovery in accordance with one or more of the various embodiments. After a start block, at block 902, in one or more of the various embodiments, one or more feature values for model objects may be provided to a similarity engine. At decision block 904, in one or more of the various embodiments, if the feature is a single valued feature, control may flow to block 906; otherwise, control may flow to decision block 910. At block 906, in one or more of the various embodiments, the similarity engine may be arranged to provide a similarity score for the single valued features. Next, control may flow to decision block 926. At decision block 910, in one or more of the various embodiments, if the feature includes a set of feature values, control may flow to block 912; otherwise, control may flow to decision block 914. At block 912, in one or more of the various embodiments, the similarity engine may be arranged to provide a similarity score for the set of feature values. Next, control may flow to decision block 926.

At decision block 914, in one or more of the various embodiments, if the feature includes a vector of feature values, control may flow to block 916; otherwise, control may flow to decision block 918. At block 916, in one or more of the various embodiments, the similarity engine may be arranged to provide a similarity score for the vector valued features. Next, control may flow to decision block 926.

At decision block 918, in one or more of the various embodiments, if the feature includes a sequence of feature values, control may flow to block 920; otherwise, control may flow to decision block 922. At block 920, in one or more of the various embodiments, the similarity engine may be arranged to provide a similarity score for the sequence valued features. Next, control may flow to decision block 926.

At decision block 922, in one or more of the various embodiments, optionally, if the feature includes another type of feature values, control may flow to block 924; otherwise, control may flow to decision block 926. At block 924, in one or more of the various embodiments, the similarity engine may be arranged to provide a similarity score for the other type of feature values. Next, control may flow to decision block 926.

At decision block 926, in one or more of the various embodiments, if there are more features to process, control may loop back to block 902; otherwise, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing data using one or more processors, included in one or more network computers, to perform actions, comprising:
   instantiating an attributes engine to perform further actions, including:
      analyzing one or more characteristics of one or more model object features of a plurality of model objects;
      classifying the one or more model object features based on the one or more characteristics, wherein the one or more characteristics include a data type and one or more values of the one or more model object features; and
      associating one or more similarity tasks with the one or more model object features based on their classification; and
   instantiating a similarity engine to perform further actions, including:
      providing a similarity model that includes the one or more similarity tasks;
      employing the similarity model to provide one or more candidate similarity scores based on one or more exemplar model objects that are labeled as being similar, wherein the one or more exemplar model objects are provided by a similarity client application;
      modifying the similarity model based on the one or more exemplar model objects and the one or more candidate similarity scores;
      employing the modified similarity model to provide similarity scores for one or more model objects, wherein providing the similarity scores is based on execution of the one or more similarity tasks that are associated with the one or more model object features of the one or more model objects; and
      identifying two or more similar model objects based on the similarity scores for visual presentation in a display to a user, wherein one or more features of the visual presentation are modified based on geo-location information of the user provided by a global positioning system (GPS) device, and wherein the one or more modified features include one or more of a time zone, language, currency, or calendar format.

2. The method of claim 1, wherein the attributes engine performs further actions, comprising:
   classifying one or more of the model object fields that include another model object by classifying the other model object's features;
   associating one or more additional similarity tasks with the other model object's features; and
   including the one or more additional similarity tasks in the similarity model.

3. The method of claim 1, wherein modifying the similarity model based on the one or more exemplar model objects, further comprises:
   employing the similarity model to provide the one or more candidate similarity scores associated with the one or more exemplar model objects;
   modifying one or more portions of the similarity model when the candidate similarity score is below a defined threshold value; and
   providing additional candidate similarity scores until one or more of the additional candidate similarity scores exceeds the defined threshold.

4. The method of claim 1, wherein the similarity client application performs further actions, comprising:
   displaying the similarity model in a user interface on a hardware display to a user to provide feedback based on the for the similarity model; and
   modifying the similarity model based on the provided feedback.

5. The method of claim 1, wherein classifying the one or more model object features, further comprises, including classification of the one or more model object features as one or more of singled valued, set valued, vector valued, or sequence valued.

6. The method of claim 1, wherein providing similarity scores for the one or more model objects, further comprises, providing a combination of one or more model object feature similarity scores, wherein the one or more model object feature similarity scores are provided by the one or more similarity tasks.

7. The method of claim 1, wherein the similarity engine performs actions, further comprising:
   associating the modified similarity model with one or more of a user, an organization, or a client; and
   differently modifying different instances of the similarity model associated with different users, different organizations, or different clients.

8. A system for managing data, comprising:
   a network computer, comprising:
      a transceiver that communicates over the network;
      a memory that stores at least instructions; and
      one or more processor devices that execute instructions that perform actions, including:
         instantiating an attributes engine to perform further actions, including:
            analyzing one or more characteristics of one or more model object features of a plurality of model objects;
            classifying the one or more model object features based on the one or more characteristics, wherein the one or more characteristics include a data type and one or more values of the one or more model object features; and
            associating one or more similarity tasks with the one or more model object features based on their classification; and
         instantiating a similarity engine to perform further actions, including:
            providing a similarity model that includes the one or more similarity tasks;
            employing the similarity model to provide one or more candidate similarity scores based on one or more exemplar model objects that are labeled as being similar, wherein the one or more exemplar model objects are provided by a similarity client application;
            modifying the similarity model based on the one or more exemplar model objects and the one or more candidate similarity scores;
            employing the modified similarity model to provide similarity scores for one or more model objects, wherein providing the similarity scores is based on execution of the one or more similarity tasks that are associated with the one or more model object features of the one or more model objects scores; and identifying two or more similar model objects based on the similarity; and a client computer, comprising:

a client computer transceiver that communicates over the network;

a client computer memory that stores at least instructions; and one or more processor devices that execute instructions that perform actions, including:

employing the similarity client application engine to provide the one or more exemplar model objects in a visual presentation in a display to a user, wherein one or more features of the visual presentation are modified based on geo-location information of the user provided by a global positioning system (GPS) device, and wherein the one or more modified features include one or more of a time zone, language, currency, or calendar format.

9. The system of claim 8, wherein the attributes engine performs further actions, comprising:

classifying one or more of the model object fields that include another model object by classifying the other model object's features;

associating one or more additional similarity tasks with the other model object's features; and including the one or more additional similarity tasks in the similarity model.

10. The system of claim 8, wherein modifying the similarity model based on the one or more exemplar model objects, further comprises:

employing the similarity model to provide the one or more candidate similarity scores associated with the one or more exemplar model objects;

modifying one or more portions of the similarity model when the candidate similarity score is below a defined threshold value; and providing additional candidate similarity scores until one or more of the additional candidate similarity scores exceeds the defined threshold.

11. The system of claim 8, wherein the similarity client application performs further actions, comprising:

displaying the similarity model in a user interface on a hardware display to a user to provide feedback based on the for the similarity model; and modifying the similarity model based on the provided feedback.

12. The system of claim 8, wherein classifying the one or more model object features, further comprises, including classification of the one or more model object features as one or more of singled valued, set valued, vector valued, or sequence valued.

13. The system of claim 8, wherein providing similarity scores for the one or more model objects, further comprises, providing a combination of one or more model object feature similarity scores, wherein the one or more model object feature similarity scores are provided by the one or more similarity tasks.

14. The system of claim 8, wherein the similarity engine performs further actions comprising:

associating the modified similarity model with one or more of a user, an organization, or a client; and differently modifying different instances of the similarity model associated with different users, different organizations, or different clients.

15. A processor readable non-transitory storage media that includes instructions for managing data, wherein execution of the instructions by one or more hardware processors performs actions, comprising:

instantiating an attributes engine to perform further actions, including:

analyzing one or more characteristics of one or more model object features of a plurality of model objects;

classifying the one or more model object features based on the one or more characteristics, wherein the one or more characteristics include a data type and one or more values of the one or more model object features; and associating one or more similarity tasks with the one or more model object features based on their classification; and instantiating a similarity engine to perform further actions, including:

providing a similarity model that includes the one or more similarity tasks;

employing the similarity model to provide one or more candidate similarity scores based on one or more exemplar model objects that are labeled as being similar, wherein the one or more exemplar model objects are provided by a similarity client application;

modifying the similarity model based on the one or more exemplar model objects and the one or more candidate similarity scores;

employing the modified similarity model to provide similarity scores for one or more model objects, wherein providing the similarity scores is based on execution of the one or more similarity tasks that are associated with the one or more model object features of the one or more model objects; and identifying two or more similar model objects based on the similarity scores for visual presentation in a display to a user, wherein one or more features of the visual presentation are modified based on geo-location information of the user provided by a global positioning system (GPS) device, and wherein the one or more modified features include one or more of a time zone, language, currency, or calendar format.

16. The media of claim 15, wherein the attributes engine performs further actions, comprising:

classifying one or more of the model object fields that include another model object by classifying the other model object's features;

associating one or more additional similarity tasks with the other model object's features; and including the one or more additional similarity tasks in the similarity model.

17. The media of claim 15, wherein modifying the similarity model based on the one or more exemplar model objects, further comprises:

employing the similarity model to provide the one or more candidate similarity scores associated with the one or more exemplar model objects;

modifying one or more portions of the similarity model when the candidate similarity score is below a defined threshold value; and providing additional candidate similarity scores until one or more of the additional candidate similarity scores exceeds the defined threshold.

18. The media of claim 15, wherein the similarity client application performs further actions, comprising:
displaying the similarity model in a user interface on a hardware display to a user to provide feedback based on the for the similarity model; and
modifying the similarity model based on the provided feedback.

19. The media of claim 15, wherein classifying the one or more model object features, further comprises, including classification of the one or more model object features as one or more of singled valued, set valued, vector valued, or sequence valued.

20. The media of claim 15, wherein providing similarity scores for the one or more model objects, further comprises, providing a combination of one or more model object feature similarity scores, wherein the one or more model object feature similarity scores are provided by the one or more similarity tasks.

21. The media of claim 15, wherein the similarity engine performs further actions comprising:
associating the modified similarity model with one or more of a user, an organization, or a client; and
differently modifying different instances of the similarity model associated with different users, different organizations, or different clients.

22. A network computer for managing data, comprising:
a transceiver that communicates over the network;
a memory that stores at least instructions; and
one or more processor devices that execute instructions that perform actions, including:
instantiating an attributes engine to perform further actions, including:
analyzing one or more characteristics of one or more model object features of a plurality of model objects;
classifying the one or more model object features based on the one or more characteristics, wherein the one or more characteristics include a data type and one or more values of the one or more model object features; and
associating one or more similarity tasks with the one or more model object features based on their classification; and
instantiating a similarity engine to perform further actions, including:
providing a similarity model that includes the one or more similarity tasks;
employing the similarity model to provide one or more candidate similarity scores based on one or more exemplar model objects that are labeled as being similar, wherein the one or more exemplar model objects are provided by a similarity client application;
modifying the similarity model based on the one or more exemplar model objects and the one or more candidate similarity scores;
employing the modified similarity model to provide similarity scores for one or more model objects, wherein providing the similarity scores is based on execution of the one or more similarity tasks that are associated with the one or more model object features of the one or more model objects; and
identifying two or more similar model objects based on the similarity scores for visual presentation in a display to a user, wherein one or more features of the visual presentation are modified based on geo-location information of the user provided by a global positioning system (GPS) device, and wherein the one or more modified features include one or more of a time zone, language, currency, or calendar format.

23. The network computer of claim 22, wherein the attributes engine performs further actions, comprising:
classifying one or more of the model object fields that include another model object by classifying the other model object's features;
associating one or more additional similarity tasks with the other model object's features; and
including the one or more additional similarity tasks in the similarity model.

24. The network computer of claim 22, wherein modifying the similarity model based on the one or more exemplar model objects, further comprises:
employing the similarity model to provide the one or more candidate similarity scores associated with the one or more exemplar model objects;
modifying one or more portions of the similarity model when the candidate similarity score is below a defined threshold value; and
providing additional candidate similarity scores until one or more of the additional candidate similarity scores exceeds the defined threshold.

25. The network computer of claim 22, wherein the similarity client application performs further actions, comprising:
displaying the similarity model in a user interface on a hardware display to a user to provide feedback based on the for the similarity model; and
modifying the similarity model based on the provided feedback.

26. The network computer of claim 22, wherein classifying the one or more model object features, further comprises, including classification of the one or more model object features as one or more of singled valued, set valued, vector valued, or sequence valued.

27. The network computer of claim 22, wherein providing similarity scores for the one or more model objects, further comprises, providing a combination of one or more model object feature similarity scores, wherein the one or more model object feature similarity scores are provided by the one or more similarity tasks.

28. The network computer of claim 22, wherein the similarity engine performs further actions comprising:
associating the modified similarity model with one or more of a user, an organization, or a client; and
differently modifying different instances of the similarity model associated with different users, different organizations, or different clients.

* * * * *